(12) United States Patent
Al Hassan

(10) Patent No.: US 12,351,453 B2
(45) Date of Patent: Jul. 8, 2025

(54) METHODS FOR CONTROLLING THE TEMPERATURE OF AN INCINERATOR

(71) Applicant: Saudi Arabian Oil Company, Dhahran (SA)

(72) Inventor: Makky H. Al Hassan, Tarout (SA)

(73) Assignee: Saudi Arabian Oil Company, Dhahran (SA)

( * ) Notice: Subject to any disclaimer, the term of this patent is extended or adjusted under 35 U.S.C. 154(b) by 869 days.

(21) Appl. No.: 17/492,768

(22) Filed: Oct. 4, 2021

(65) Prior Publication Data

US 2023/0107975 A1 Apr. 6, 2023

(51) Int. Cl.
| | |
|---|---|
| *F23N 5/00* | (2006.01) |
| *C01B 17/50* | (2006.01) |
| *F23G 7/06* | (2006.01) |
| *F23N 1/02* | (2006.01) |

(52) U.S. Cl.
CPC .......... *C01B 17/508* (2013.01); *F23G 7/065* (2013.01); *F23N 1/022* (2013.01); *F23N 5/006* (2013.01); *F23G 2204/103* (2013.01); *F23G 2207/101* (2013.01); *F23G 2207/112* (2013.01); *F23G 2207/40* (2013.01); *F23G 2209/14* (2013.01); *F23N 2225/10* (2020.01); *F23N 2239/04* (2020.01); *F23N 2241/18* (2020.01)

(58) Field of Classification Search
CPC . C01B 17/508; F23G 7/065; F23G 2204/103; F23G 2207/101; F23G 2207/112; F23G 2207/40; F23G 2209/14; F23N 1/022; F23N 5/006; F23N 2225/10; F23N 2241/18; F23N 2239/04

USPC .......................................................... 431/5
See application file for complete search history.

(56) References Cited

U.S. PATENT DOCUMENTS

| | | | |
|---|---|---|---|
| 4,332,774 A * | 6/1982 | Drum ................... | C01B 17/162 422/111 |
| 5,266,274 A | 11/1993 | Taggart et al. | |
| 5,508,013 A * | 4/1996 | Kvasnikoff ............ | B01D 53/52 423/220 |
| 7,504,260 B1 * | 3/2009 | Lang ...................... | G05D 23/19 422/111 |
| 2006/0133971 A1 | 6/2006 | Sun et al. | |
| 2012/0237438 A1 | 9/2012 | Boiko | |
| 2013/0302738 A1 * | 11/2013 | Rennie ................... | F23N 1/022 431/12 |

(Continued)

FOREIGN PATENT DOCUMENTS

| | | |
|---|---|---|
| EP | 0220610 B1 | 10/1986 |
| JP | 3947892 B2 | 7/2007 |

(Continued)

*Primary Examiner* — Avinash A Savani
(74) *Attorney, Agent, or Firm* — DINSMORE & SHOHL LLP

(57) ABSTRACT

A method for controlling a temperature of an incinerator may include determining a flow rate of a gas stream. The gas stream may be being passed from a sulfur recovery system to the incinerator. The method may include adjusting a target temperature of the incinerator. The target temperature of the incinerator is proportional to the flow rate of the gas stream. The method may include determining a temperature of the incinerator and adjusting the flow rate of a fuel gas being passed to the incinerator such that the temperature of the incinerator approaches the target temperature of the incinerator.

19 Claims, 4 Drawing Sheets

(56) References Cited

U.S. PATENT DOCUMENTS

2015/0267916 A1\* 9/2015 Wen ........................ F23G 5/444
110/235
2017/0284231 A1\* 10/2017 Ui ............................. F01N 5/02
2022/0027708 A1\* 1/2022 Mori ........................ G06N 3/08

FOREIGN PATENT DOCUMENTS

| WO | 2015069975 A1 | 5/2015 |
| WO | 2017205019 A1 | 11/2017 |

\* cited by examiner

METHODS FOR CONTROLLING THE TEMPERATURE OF AN INCINERATOR

TECHNICAL FIELD

Embodiments of the present disclosure generally relate to chemical processing, more specifically, to methods for controlling temperature.

BACKGROUND

In various chemical processing systems, incinerators may be used to reduce the amount of various components being passed from the chemical processing system to the atmosphere. For example, conventional sulfur recovery units convert hydrogen sulfide to sulfur. However, some unconverted hydrogen sulfide is usually passed out of the sulfur recovery unit. To prevent excess hydrogen sulfide from being released into the atmosphere, an incinerator may be used to oxidize at least a portion of the hydrogen sulfide to sulfur dioxide, which may have less environmental impact than hydrogen sulfide. Likewise, incinerators may be used after other chemical processes to oxidize other potential contaminants before such contaminants could be released into the atmosphere.

SUMMARY

In conventional methods for controlling the temperature of an incinerator, the set point for the temperature of the incinerator is constant, regardless of the flow rate of a feed stream to the incinerator. The temperature of the incinerator is usually held constant to ensure that an appropriate amount of contaminants, such as hydrogen sulfide, in the feed are oxidized in the incinerator. However, holding the temperature of the incinerator constant may result in an increased consumption of fuel gas that is used to heat the incinerator. This may lead to high operating costs for running the incinerator. Accordingly, there is a need for improved methods for controlling the temperature of an incinerator.

The presently described methods address one or more of these problems. Methods for controlling the temperature of the incinerator contemplated in the present disclosure may include adjusting the temperature set point of the incinerator based on the flow rate of a gas stream being fed to the incinerator from another chemical process, such as a sulfur recovery process. This may allow the incinerator to operate at lower temperatures on average than incinerators operated with conventional temperature control strategies, while still maintaining the desired conversion of contaminants. An incinerator operating at lower temperatures generally requires less fuel gas to heat the incinerator. Accordingly, the presently described methods for controlling the temperature of the incinerator may allow the incinerator to consume less fuel gas and incur lower operating costs than incinerators operated under conventional temperature control strategies.

According to one or more embodiments, a method for controlling a temperature of an incinerator may comprise determining a flow rate of a gas stream. The gas stream is being passed from a sulfur recovery system to the incinerator. The method may include adjusting a target temperature of the incinerator. The target temperature of the incinerator is proportional to the flow rate of the gas stream. The method may include determining a temperature of the incinerator and adjusting the flow rate of a fuel gas being passed to the incinerator such that the temperature of the incinerator approaches the target temperature of the incinerator.

According to one or more embodiments, a method for converting hydrogen sulfide to sulfur dioxide may include passing a gas stream comprising hydrogen sulfide to an incinerator, passing an oxygen containing gas to the incinerator, passing a fuel gas to the incinerator, combusting at least a portion of the fuel gas to heat the incinerator; converting at least a portion of the hydrogen sulfide to sulfur dioxide in the incinerator; and passing a flue gas comprising sulfur dioxide from the incinerator. The incinerator has a temperature controlled by a method including determining a flow rate of the gas stream and adjusting a target temperature of the incinerator. The target temperature of the incinerator is proportional to the flow rate of the gas stream. The method for controlling the temperature of the incinerator may also include determining a temperature of the incinerator and adjusting the flow rate of the fuel gas to the incinerator such that the temperature of the incinerator approaches the target temperature of the incinerator.

Additional features and advantages of the described embodiments will be set forth in the detailed description which follows, and in part will be readily apparent to those skilled in the art from that description or recognized by practicing the described embodiments, including the detailed description which follows and the claims.

BRIEF SUMMARY OF THE DRAWINGS

The following detailed description of specific embodiments of the present disclosure can be best understood when read in conjunction with the following drawings in which.

Reference will now be made in greater detail to various embodiments, some embodiments of which are illustrated in the accompanying drawings. Whenever possible, the same reference numerals will be used throughout the drawings to refer to the same or similar parts.

DETAILED DESCRIPTION

The detailed description discloses one or more embodiments relevant to the appended claims. As described herein, methods for controlling the temperature of an incinerator may be performed on a system including an incinerator positioned downstream of a sulfur recovery unit. While the methods for controlling the temperature of the incinerator are described within the context of the system 100 of FIG. 1, it should be understood that the presently described methods may be applicable to other systems which utilize different system components arranged in different ways or performing different reactions or working at different operating conditions.

Figure 1:
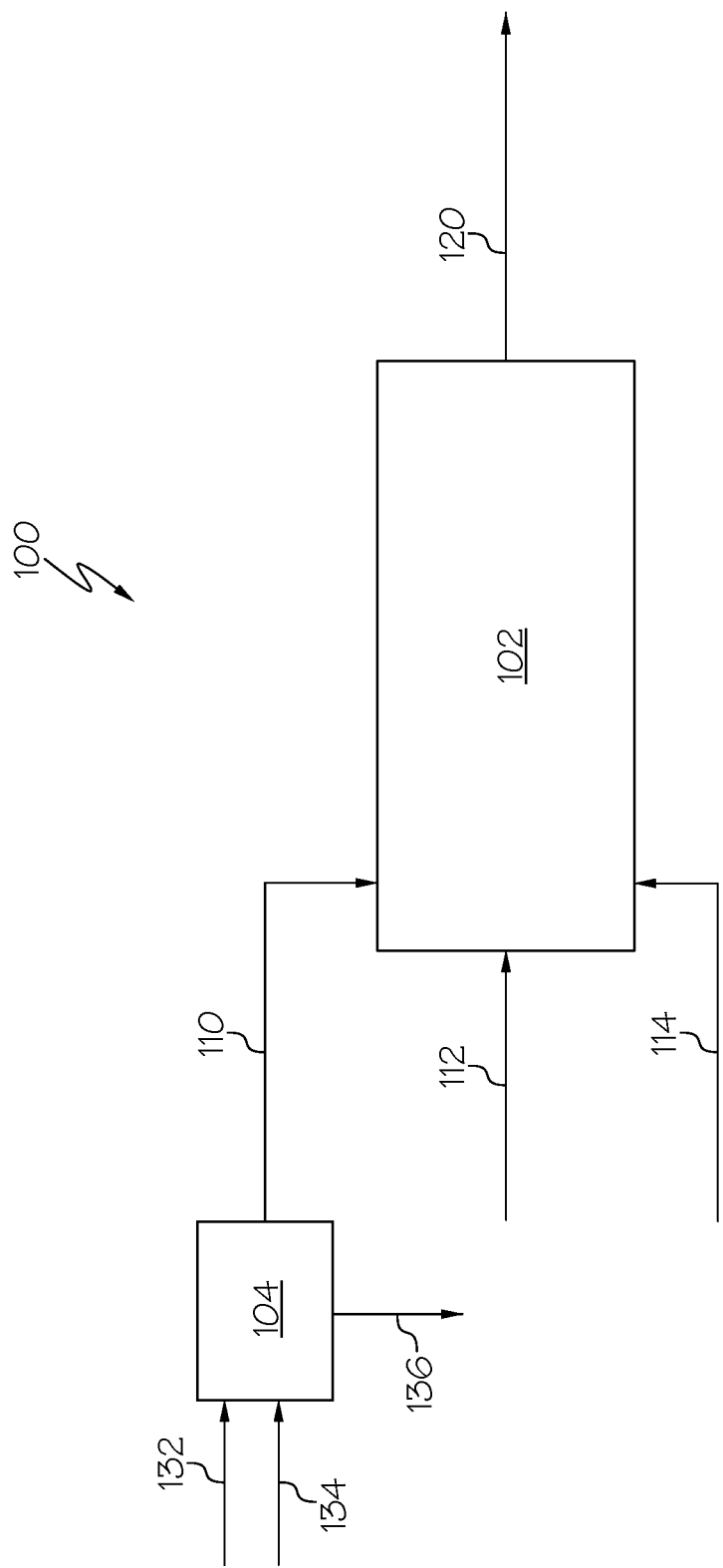
FIG. 1 schematically depicts an incinerator system according to one or more embodiments described herein.

Referring to FIG. 1, the system 100 includes an incinerator 102 positioned downstream of sulfur recovery unit 104. The sulfur recovery unit 104 may be any unit capable of producing sulfur 136 from an acid gas stream 132 and an air stream 134. For example, the sulfur recovery unit 104 may be operable to perform a Claus process for recovering sulfur from gaseous hydrogen sulfide. The sulfur recovery unit 104 may produce a gas stream 110 comprising hydrogen sulfide. This gas stream 110 may be passed from the sulfur recovery unit 104 to the incinerator 102. The incinerator 102 may be any piece of process equipment suitable for oxidizing hydrogen sulfide. In addition to gas stream 110, a fuel gas 112 and an oxygen containing gas stream 114 may be passed to the incinerator 102, and the fuel gas 112 may be combusted to heat the incinerator 102. A flue gas 120 having a reduced concentration of hydrogen sulfide may exit the incinerator 102.

In one or more embodiments, the methods for controlling the temperature of the incinerator 102 may comprise determining the flow rate of gas stream 110, adjusting a target temperature of the incinerator 110, determining a temperature of the incinerator; and adjusting the flow rate of a fuel gas being passed to the incinerator such that the temperature of the incinerator approaches the target temperature of the incinerator. These method steps are now described in further detail.

The method for controlling the temperature of the incinerator 102 may comprise determining the flow rate of gas stream 110. The flow rate of gas stream 110 is generally a mass flow rate of the gas stream. In one or more embodiments, determining the flow rate of the gas stream 110 may comprise measuring the flow rate of the gas stream 110 with a flow meter. Any flow meter operable to measure the mass flow rate of a gas may be used. For example, suitable flow meters may include, but not limited to, thermal mass flow meters and Coriolis mass flow meters.

In some embodiments, it may not be possible to directly measure the flow rate of gas stream 110. For example, in some system configurations it may not be possible or practical to install a flow meter for measuring the flow rate of gas stream 110. In such embodiments, determining the flow rate of gas stream 110 may comprise calculating the flow rate of gas stream 110 from a mass balance of sulfur recovery system 104. The mass balance may be performed by any suitable means. In the exemplary embodiment of FIG. 1, the flow rate of the gas stream 110 may be calculated by Equation 1:

Gas Stream 110 (kg/s)=Acid Gas Stream 132 (kg/s)+ Air Stream 134 (kg/s)−Sulfur 136 (kg/s)     Equation 1

In some embodiments, the flow rate of gas stream 110 may be determined by using a correlation between the flow rate of acid gas 132 being fed to the sulfur recovery system 104 and the flow rate of gas stream 110. An exemplary correlation is displayed in Equation 2:

Gas stream 110 (kg/s)=$K$×Acid Gas Stream 132 (kg/s)     Equation 2

In Equation 2, K may be a constant. The value of K may depend on the configuration of sulfur recovery system 104 and on the specific operating parameters and operating conditions used in the sulfur recovery system 104. In an exemplary embodiment, K may equal 1.45.

The method for controlling the temperature of the incinerator 102 may include adjusting a target temperature of the incinerator 102. As described herein, the "target temperature" of the incinerator 102 is the desired temperature at which the incinerator 102 should operate. For example, the temperature of the incinerator 120 is generally substantially equal to the target temperature or approaching the target temperature during normal operation of the incinerator. In one or more embodiments, the target temperature of the incinerator 102 may be adjusted such that the target temperature of the incinerator 102 is proportional to the flow rate of the gas stream 110.

Without intending to be bound by theory, the rate of oxidation of hydrogen sulfide to sulfur dioxide inside the incinerator 102 is directly proportional to the temperature of the incinerator 102 and the residence time of the gas in the incinerator 102. Accordingly, a constant rate of hydrogen sulfide oxidation may be maintained by adjusting the residence time of the incinerator 102 and the temperature of the incinerator 102. There is generally a proportional relationship between the residence time of the incinerator 102 and the temperature of the incinerator 102 necessary to maintain a constant rate of hydrogen sulfide oxidation. Accordingly, as the residence time of the incinerator 102 changes, the temperature of the incinerator 102 may be adjusted to maintain the desired oxidation rate of hydrogen sulfide. The residence time of the incinerator 102 is usually dependent on the flow rate of the gas stream 110 being passed to the incinerator 102. Generally, as the flow rate of the gas stream 110 being fed to the incinerator 102 increases, the residence time of the incinerator 102 decreases, and as the flow rate of the gas stream 110 decreases, the residence time of the incinerator 102 increases. Accordingly, there is a proportional relationship between the flow rate of the gas stream 110 and the temperature of the incinerator 102 necessary to maintain a constant rate of hydrogen sulfide oxidation. In one or more embodiments, as the flow rate of the gas stream 110 increases, the target temperature of the incinerator 102 may be increased. Likewise, as the flow rate of the gas stream 110 decreases, the target temperature of the incinerator 102 may be decreased. It should be noted that the relationships between hydrogen sulfide oxidation rate, incinerator residence time, gas feed flow rate, and incinerator temperature are described herein in general terms, and it is contemplated that specific relationships between these variables may be dependent on the specific design of the incinerator. A method for determining a specific relationship between incinerator temperature and gas stream flow rate in an exemplary incinerator system is further discussed in the Examples included in herein.

In one or more embodiments, adjusting the target temperature of the incinerator 102 may include calculating a target temperature using an equation relating the flow rate of the gas stream 110 to the target temperature of the incinerator 102. This calculation may be performed by any suitable means. For example, the target temperature of the incinerator may be calculated by hand or by machine. In one or more embodiments, the target temperature of the incinerator 102 may be calculated by a temperature controller, which may be part of a control system.

The target temperature of the incinerator 102 may be adjusted within the bounds of a maximum target temperature and a minimum target temperature. Specifically, the target temperature of the incinerator may be less than or equal to the minimum target temperature, and the target temperature of the incinerator may be greater than or equal to the maximum target temperature of the incinerator. The minimum target temperature may correspond to a minimum flow rate at which the incinerator 102 is operable. Likewise, the maximum target temperature may correspond to a maximum flow rate at which the incinerator 102 is operable.

Without intending to be bound by theory, processing equipment, including incinerators, are generally designed to operate under certain conditions. Generally, incinerators are designed with a specific turndown ratio. The turndown ratio may be a ratio of the maximum flow rate to minimum flow rate of gas feed at which the incinerator is efficiently or controllably operable. Alternatively, the turndown ratio may be a ratio of the maximum fuel gas flow rate to minimum fuel gas flow rate at which the incinerator is efficiently or controllably operable. Incinerators also generally designed to have a maximum temperature at which the incinerator is efficiently or controllably operable. In the presently described methods, the maximum target temperature and minimum target temperature may be determined based on the turndown ratio of the incinerator 102, considering the maximum and minimum flow rates of gas feed or fuel gas at which the incinerator 102 is designed to operate. Additionally, the incinerator 102 may be designed to operate efficiently and controllably within a temperature range that is unrelated to the flow rate of the gas stream 110 fed to the incinerator 102. In one or more embodiments, the maximum target temperature and the minimum target temperature of the incinerator 102 may be within the temperature range at which the incinerator 102 is designed to operate efficiently and controllably.

The method for controlling the temperature of the incinerator 102 may include determining the temperature of the incinerator 102. The temperature of the incinerator 102 may be determined by any suitable means. For example, the temperature of the incinerator 102 may be measured by one or more temperature sensors positioned within the incinerator 102, or the temperature of the incinerator 102 may be determined by measuring the temperature of the flue gas 120 at the exit of the incinerator 102. The one or more temperature sensors may be any suitable temperature sensors, including but not limited to thermocouples and heat flux sensors.

The method for controlling the temperature of the incinerator 102 may include adjusting the flow rate of a fuel gas 112 being passed to the incinerator 102. In one or more embodiments, the incinerator 102 is heated by burning a fuel gas 112. The fuel gas 112 may comprise one or more combustible gasses. For example, the fuel gas 112 may comprise methane, ethane, propane, or combinations thereof. In one or more embodiments, the rate of the fuel gas 112 being passed to the incinerator 102 is adjusted such that the temperature of the incinerator 102 approaches the target temperature of the incinerator 102. Without intending to be bound by theory, adjusting the rate at which the fuel gas 112 is passed to the incinerator 102 generally affects the rate at which heat is generated in the incinerator 102. For example, as the flow rate of the fuel gas 112 increases, the temperature of the incinerator 102 increases, and as the flow rate of the fuel gas 112 decreases, the temperature of the incinerator 102 decreases. Accordingly, in embodiments where the temperature of the incinerator 102 is greater than the temperature set point, the flow rate of fuel gas 112 may be decreased such that the temperature of the incinerator approaches the temperature set point. Likewise, in embodiments where the temperature of the incinerator 102 is less than the temperature set point, the flow rate of fuel gas 112 to the incinerator 102 may be increased such that the temperature of the incinerator 102 approaches the temperature set point.

In one or more embodiments, the method for controlling the temperature of the incinerator 102 described herein may be performed by a control system. As described herein a "control system" is operable to control the operation of a device or system. The control system may be any suitable control system, including but not limited to a feedback control system, which is operable to compare the value of a process variable to a set point and adjust the operation of the device or system such that the process variable approaches the setpoint. In one or more embodiments, the control system may comprise a temperature controller. The temperature controller may be operable to calculate a temperature set point from flow data from the gas stream 110 and temperature data from the incinerator 102. The temperature controller may be communicatively coupled to one or more input devices to receive data regarding the flow rate of the gas stream 110 and the temperature of the incinerator 102. The temperature controller may be communicatively coupled at least one control valve operable to adjust the flow rate of the fuel gas 112. The temperature controller may include at least one processor, at least one memory module communicatively coupled to the at least one process, and machine readable and executable instructions stored on the at least one memory module, that when executed by the at least one processor may cause the temperature controller to adjust the position of the at least one control valve to vary the flow rate of the fuel gas 112 to the incinerator 102.

The temperature controller described in the present disclosure is an example of a suitable computing device but does not suggest any limitation on the scope of any embodiments presented. It is understood that various methods and control schemes described in the present disclosure may be implemented using one or more analog control devices in addition to, or as an alternative to, the temperature controller. The temperature controller may include, but is not limited to, an industrial controller, desktop computer, laptop computer, server, client computer, tablet, smartphone, or any other type of device that can send data, receive data, store data, and perform one or more calculations. The temperature controller can include a display. The temperature controller may further include one or more input devices which can include, by way of example, any type of mouse, keyboard, keypad, radio buttons, toggle switches, touchscreen, sensors, or any suitable input device. The temperature controller may be connected to the input devices and the one or more control valves by any suitable means, including a wireless network or a wired network.

It is contemplated that the methods for controlling the temperature of an incinerator may be applied to methods for converting hydrogen sulfide to sulfur dioxide. Generally the methods for converting hydrogen sulfide to sulfur dioxide described herein comprise passing a gas stream comprising hydrogen sulfide to an incinerator; passing an oxygen containing gas to the incinerator; passing a fuel gas to the incinerator; combusting at least a portion of the fuel gas to heat the incinerator; converting at least a portion of the hydrogen sulfide to sulfur dioxide in the incinerator; and passing a flue gas comprising sulfur dioxide from the incinerator. These method steps are now described in further detail.

As described herein, methods for converting hydrogen sulfide to sulfur dioxide may comprise passing a gas stream 110 comprising hydrogen sulfide to the incinerator. In one or more embodiments, the concentration of hydrogen sulfide in the gas stream may be from 10 ppm to 400 ppm by mole. For example, the concentration of hydrogen sulfide in the gas stream may be from 10 ppm to 400 ppm, from 50 ppm to 400 ppm, from 100 ppm to 400 ppm, from 150 ppm to 400 ppm, from 200 ppm to 400 ppm, from 250 ppm to 400 ppm, from 300 ppm to 400 ppm, from 350 ppm to 400 ppm, from 10 ppm to 350 ppm, from 10 ppm to 300 ppm, from 10 ppm, to 250 ppm, from 10 ppm to 200 ppm, from 10 ppm to 150 pm, from 10 ppm to 100 ppm, from 10 ppm to 50 ppm, or any combination or subset of these ranges. It should be noted that the methods for converting hydrogen sulfide to sulfur dioxide contemplated herein may be operable to convert hydrogen sulfide to sulfur dioxide in gas streams having a wide range of concentrations of hydrogen sulfide, not necessarily limited to concentrations from 10 ppm to 400 ppm.

In one or more embodiments, the concentration of hydrogen sulfide in the gas stream 110 may be substantially constant. As described herein, when a concentration is "substantially constant" the concentration varies by less than or equal to 10%, less than or equal to 5%, less than or equal to 2%, or even less than or equal to 1%. Without intending to be bound by theory, the concentration of hydrogen sulfide in the gas stream 110 may affect the temperature of the incinerator necessary to reduce the concentration of hydrogen sulfide to an acceptable level. However, when the concentration of hydrogen sulfide in the gas stream 110 is substantially constant, the temperature of the incinerator 102 may be controlled based on the flow rate of the gas stream 110. In some embodiments, it may be simpler and more practical to determine the flow rate of the gas stream 110 than the concentration of the hydrogen sulfide in the gas stream 110. Accordingly, using the flow rate of the gas stream 110 to control the temperature of the incinerator 102 may allow for a simpler and more practical control strategy. However, it should be noted that, in embodiments where the concentration of hydrogen sulfide in the gas stream 110 is not substantially constant, the methods for determining the target temperature of the incinerator may account for expected fluctuations in the concentration of hydrogen sulfide in the gas stream 110.

In one or more embodiments, the gas stream 110 may further comprise sulfur-containing compounds in addition to hydrogen sulfide. Such sulfur-containing compounds may include, but are not limited to, $SO_2$, $COS$, $CS_2$, $S_2$, $S_6$, $S_8$. Additionally, the gas stream 110 may further comprise gasses found in air, such as $CO$, $H_2$, $CO_2$, $O_2$, $N_2$, and $Ar$. In embodiments, the gas stream 110 may further comprise water vapor.

In one or more embodiments, the gas stream 110 may be passed to the incinerator 102 from a sulfur recovery unit 104. The sulfur recovery unit 104 may be any unit that is capable of recovering sulfur from an acid gas stream 134. For example, the sulfur recovery unit 104 may include the necessary process equipment for performing a Claus process, in which gaseous hydrogen sulfide is converted to elemental sulfur. Typical Claus processes include a thermal reaction step and a catalytic reaction step. In embodiments, the sulfur recovery unit 104 may comprise the necessary process equipment to carry out each step of the Claus process. The Claus process typically produces elemental sulfur, which may leave sulfur recovery unit 104 in sulfur stream 136. Generally, the Claus process does not convert all of the hydrogen sulfide in the acid gas stream 134 to elemental sulfur. Accordingly, gas stream 110 comprising hydrogen sulfide may be passed from the sulfur recovery unit 104 to the incinerator 102.

The methods for converting hydrogen sulfide to sulfur dioxide may comprise passing an oxygen containing gas stream 114 to the incinerator 102. The oxygen containing gas stream 114 may be any gas stream comprising oxygen. It should be noted that in embodiments where oxygen is present in gas stream 110, that the oxygen containing gas stream 114 is distinct from gas stream 110. In embodiments, the oxygen containing gas stream 114 may comprise air. Accordingly, the oxygen containing gas stream 114 may further comprise $N_2$, $Ar$, and $CO_2$, among other gasses usually found in air. In embodiments, the oxygen containing gas stream 114 may be air enriched in oxygen. The air enriched in oxygen may comprise oxygen at a concentration greater than that of ambient air. For example, when ambient air comprises approximately 21 mol. % oxygen, air enriched in oxygen comprises greater than 21 mol. % oxygen. Air enriched in oxygen may be produced by any suitable method.

Without intending to be bound by theory, the oxygen containing gas stream 114 serves multiple purposes in the incinerator 102. Specifically, the oxygen in oxygen containing gas stream 114 is used during the combustion of fuel gas 112 to heat the incinerator 102. Furthermore, oxygen is used during the oxidation of species in the gas stream 110, such as hydrogen sulfide. Accordingly, the flow rate of the oxygen containing gas stream 114 should be sufficient to provide excess oxygen to the incinerator 102.

The methods for converting hydrogen sulfide to sulfur dioxide may comprise passing a fuel gas 112 to the incinerator 102. The fuel gas 112 may comprise methane, ethane, propane, or combinations thereof. In embodiments, at least a portion of the fuel gas 112 may be combusted to heat the incinerator 102. Accordingly, the flow rate of the fuel gas 112 to the incinerator 102 should be sufficient to heat the incinerator to the target temperature.

The methods for converting hydrogen sulfide to sulfur dioxide may comprise converting at least a portion of the hydrogen sulfide to sulfur dioxide in the incinerator. In one or more embodiments, hydrogen sulfide may be converted to sulfur dioxide according to Reaction (I):

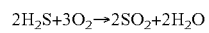

$$2H_2S + 3O_2 \rightarrow 2SO_2 + 2H_2O \qquad \text{Reaction (I)}$$

The methods for converting hydrogen sulfide to sulfur dioxide may comprise passing a flue gas 120 comprising sulfur dioxide from the incinerator. In one or more embodiments, the flue gas 120 may further comprise hydrogen sulfide and a concentration of hydrogen sulfide in the flue gas may be less than or equal to 150 ppm by volume. For example, the concentration of hydrogen sulfide in the flue gas 120 may be less than or equal to 150 ppm, less than or equal to 100 ppm, less than or equal to 75 ppm, less than or equal to 50 ppm, less than or equal to 25 ppm, less than or equal to 10 ppm, less than or equal to 9 ppm, less than or equal to 8 ppm, less than or equal to 7 ppm, less than or equal to 6 ppm, less than or equal to 5 ppm, less than or equal to 4 ppm, less than or equal to 3 ppm, less than or equal to 2 ppm, or any combination or subset of these ranges. It should be noted that the target concentration of $H_2S$ in the flue gas 120 may vary depending on regulatory requirements. Accordingly, a broad range of target $H_2S$ concentrations may be selected for flue gas 120.

In one or more embodiments, the flue gas 120 may further comprise oxygen ($O_2$). The method for converting hydrogen sulfide to sulfur dioxide may comprise controlling the concentration of oxygen present in the flue gas. The concentration of oxygen present in the flue gas 120 may be controlled by a method including determining the concentration of oxygen in the flue gas 120 and adjusting the flow rate of the oxygen containing gas 114 being passed to the incinerator 102.

The concentration of oxygen may be determined by any suitable means. In one or more embodiments, the concentration of oxygen in the flue gas 120 may be determined by an oxygen sensor. The oxygen sensor may be positioned downstream of the incinerator. The oxygen sensor may be any sensor operable to measure the proportion of oxygen in the fluid being analyzed.

The flow rate of the oxygen containing gas stream 114 being passed to the incinerator 102 may be adjusted such that the concentration of oxygen in the flue gas 120 approaches a target concentration of oxygen. As described herein, the "target concentration of oxygen" refers to desired concentration of oxygen in the flue gas 120. In one or more embodiments, the target concentration of oxygen in the flue gas 120 may be from 1 mol. % to 3 mol. %. For example, the target concentration of oxygen in the flue gas may be from 1 mol. % to 3 mol. %, from 1.5 mol. % to 3 mol. %, from 2 mol. % to 3 mol. %, from 2.5 mol. % to 3 mol. %, 1 mol. % to 2.5 mol. %, 1 mol. % to 2 mol. %, 1 mol. % to 1.5 mol. %, or any combination or subset of these ranges. Without intending to be bound by theory, controlling the concentration of oxygen in the flue gas to be from 1 mol. % to 3 mol. % may allow for excess oxygen to be present in the incinerator 102 while preventing excessive consumption of fuel gas 112 and preventing excessive formation of nitrogen oxides and sulfur oxides in the incinerator 102, which could be released to the atmosphere in flue gas 120. Without intending to be bound by theory, as oxygen is necessary for the combustion of fuel gas and for the oxidation of hydrogen sulfide, it is generally desirable to have an excess amount of oxygen in the incinerator 102. However, it is also desirable to reduce the amount of nitrogen oxides and sulfur oxides released into the atmosphere from the incinerator 102 in flue gas 120. Additionally, reducing the consumption of fuel gas 112 may reduce the operating costs of running the incinerator 102. Maintaining a concentration of oxygen in the flue gas 102 from 1 mol. % to 3 mol. % may allow for excess oxygen to be present in the incinerator while minimizing the formation of nitrogen oxides and sulfur oxides in the tail gas 120 and minimizing the fuel gas 112 required to operate the incinerator 102. However, it should be noted that this range for the concentration of oxygen may be different in various alternative embodiments, depending on the design and operating conditions of the incinerator.

EXAMPLES

The examples are representative of embodiments of the presently disclosed subject matter, and are not meant as limiting the scope of the claims.

The incinerator was modeled as an isothermal plug flow reactor. Then a HYSYS simulation using a Sulsim sub flowsheet and an incinerator unit operation was run for comparison to account for non-ideality of the simple isothermal plug flow reactor model, side reactions and variations in the $H_2S$ concentration as air and fuel gas flow rates vary with incinerator temperature. Both models showed that temperature is inversely correlated with residence time. However, the simple isothermal plug flow model underestimated the required temperature, because it did not account for non-idealities, side reactions, and variations in $H_2S$, air, and fuel gas flow rates as incinerator temperature changed. Accordingly, the HYSYS model using the Sulsim sub flowsheet and incinerator unit operation was used to perform the simulations described in the present examples.

The reaction kinetics for the oxidation of hydrogen sulfide to sulfur dioxide used during the modeling were obtained from the literature. Specifically, the reaction kinetics were modeled based off of Reaction (I):

$$2H_2S + 3O_2 \rightarrow 2SO_2 + 2H_2O \quad \text{Reaction (I)}$$

The reaction rate is represented by Equations 3 and 4 where $-r_{H2S}$ is the rate of reaction $C_{H2S}$ is the concentration of hydrogen sulfide, $C_{O2}$ is the concentration of oxygen, k is the rate constant, T is the absolute temperature (in Kelvin), A is the pre-exponential factor, $E_a$ is the activation energy for the reaction (4.6E4 J/mol), and R is the universal gas constant.

$$-r_{H_2S} = kC_{H_2S}C_{H_2S}^{1.5} \quad \text{Equation 3}$$

$$k = A e^{-\frac{E_a}{RT}} \quad \text{Equation 4}$$

The pre-exponential factor, A, was found to be giving unreasonable results when compared with the incinerator in the design case when A had a value of 4.728E8 (mol/m³s), which was obtained from the literature. (Raj, A., Ibrahim, S., & Jagannath, A. (2020). Combustion kinetics of $H_2S$ and other sulfurous species with relevance to industrial processes. *Progress in Energy and Combustion Science*, 80, 100848.) Accordingly, the value of A was adjusted to 2.29E8 (kmol/m³s), which matched the design case, accounting for non-ideality and potential side reactions.

The modeled incinerator received a tail gas stream from a sulfur recovery unit, a fuel gas stream, and an air stream. The air stream was passed to the incinerator at atmospheric pressure, a temperature of 90° F., and at 60% relative humidity. The conditions for the tail gas stream are shown in Table 1, and the conditions for the fuel gas stream are shown in Table 2.

TABLE 1

Tail Gas Conditions

| Molecule | Mol Fraction |
| --- | --- |
| Tail Gas Composition | |
| $H_2S$ | 0.00023 |
| $SO_2$ | 0.00136 |
| COS | 0.00003 |
| $CS_2$ | 0.00011 |
| $S_2$ | 0 |
| $S_6$ | 0.00001 |
| $S_8$ | 0.00004 |
| CO | 0.02443 |
| $H_2$ | 0.01364 |
| $CO_2$ | 0.22807 |
| $O_2$ | 0.00501 |
| $N_2$ | 0.44551 |
| AR | 0.00531 |
| H2O | 0.27625 |
| Tail Gas Conditions | |
| P (psig) | −4.0e−2 |
| T (Deg F.) | 255 |

TABLE 2

Fuel Gas Conditions

| Component | Mol Fraction |
| --- | --- |
| Fuel Gas Composition | |
| $CH_4$ | 0.9798 |
| $C_2H_6$ | 0.0108 |
| $C_3H_8$ | 0.0001 |
| $N_2$ | 0.0094 |
| Fuel Gas Conditions | |
| P (psig) | 30 |
| T (Deg F.) | 81 |

The general operating conditions for the incinerator are shown in Table 3.

TABLE 3

| Incinerator Conditions | |
|---|---|
| Incinerator Delta P [psi] | 0.11 |
| Target Outlet O$_2$ Mole Fraction | 0.02 |
| Kinetic Value | 3 |
| Incinerator Volume [ft$^3$] | 7818.7 |

The incinerator was modeled running at a constant incinerator outlet temperature of 1292° F. over a range of tail gas flow rates. The minimum tail gas flow rate was 1 million standard cubic feet per day (MMSCFD) and the maximum tail gas flow rate was 150 MMSCFD. The concentration of hydrogen sulfide and the concentration of oxygen in the flue gas leaving the incinerator were determined over the range of tail gas flow rates. The results of the simulation are displayed in FIGS. 2 and 3.

The incinerator was also modeled where the outlet temperature of the incinerator was variable, such that the concentration of hydrogen sulfide in the flue gas leaving the incinerator was 6.2 ppm by mol. over a range of tail gas flow rates. The minimum tail gas flow rate was 1 MMSCFD and the maximum tail gas flow rate was 150 MMSCFD. The temperature of the incinerator and the concentration of oxygen in the flue gas were determined over the range of tail gas flow rates. The results of the simulation are displayed in FIGS. 2-4. The minimum temperature of the incinerator was 681.5° F. and the maximum temperature of the incinerator was 1291° F.

Figure 2:
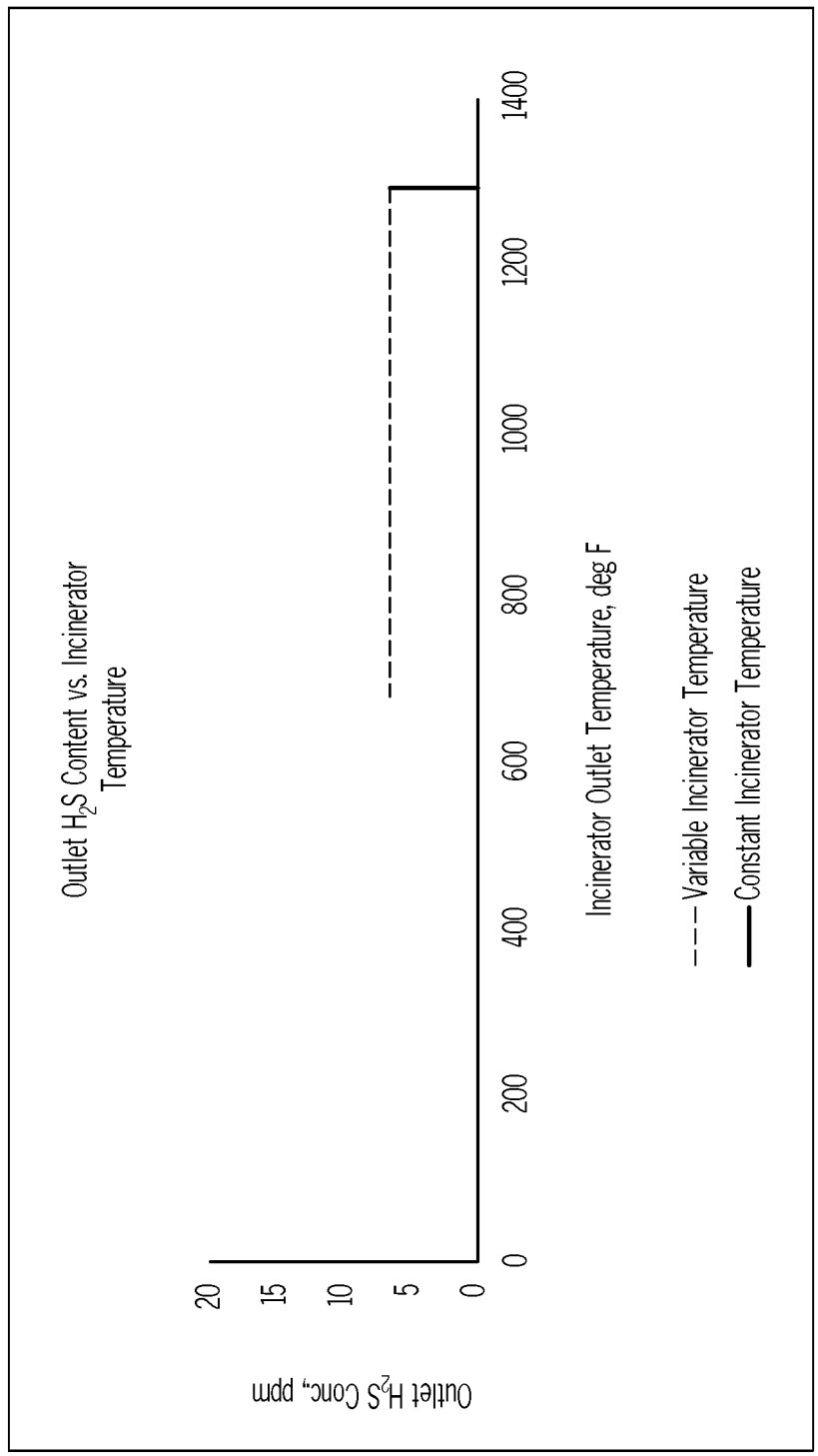
FIG. 2 depicts the concentration of hydrogen sulfide in an incinerator flue gas over a range of incinerator temperatures according to an exemplary embodiment described herein.

FIG. 2 depicts the concentration of hydrogen sulfide in the flue gas from the incinerator as the incinerator outlet temperature changed. As depicted in FIG. 2, in the simulation where the temperature of the incinerator was held constant, the concentration of hydrogen sulfide in the flue gas dropped as the flow rate of tail gas to the incinerator decreased and the temperature was maintained at 1292° F. FIG. 2 also shows that the incinerator was able to maintain a constant concentration of hydrogen sulfide in the tail gas when the temperature of the incinerator was variable. Accordingly, adjusting the temperature of the incinerator as the flow rate of tail gas being fed to the incinerator changed resulted in the incinerator operating at lower temperatures while still maintaining the desired conversion of hydrogen sulfide.

Figure 3:
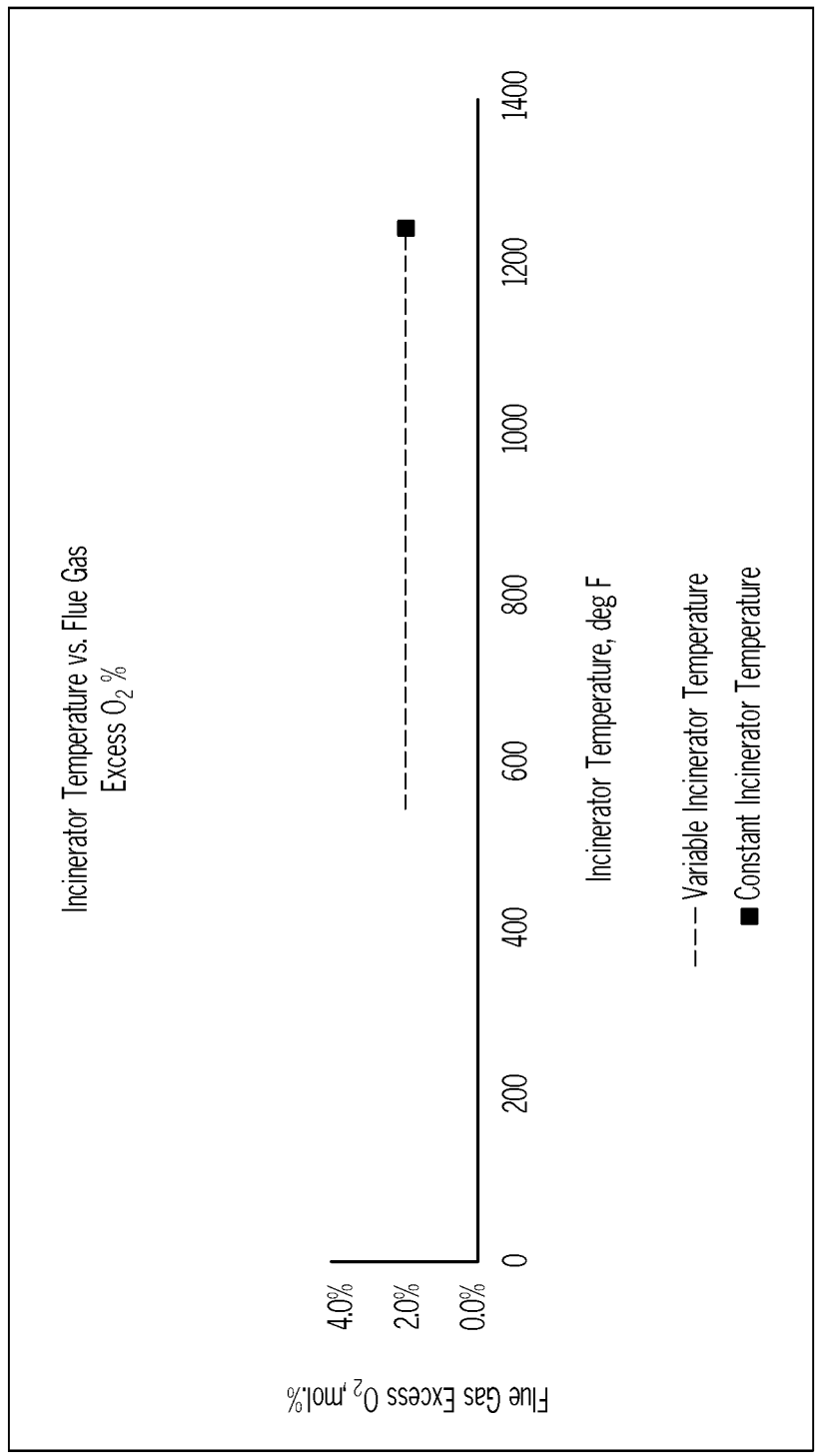
FIG. 3 depicts the concentration of oxygen in an incinerator flue gas over a range of incinerator temperatures according to an exemplary embodiment described herein.

FIG. 3 depicts the concentration of oxygen in the flue gas from the incinerator as the incinerator outlet temperature changed. As depicted in FIG. 3, in the simulation where the temperature of the incinerator was held constant, the concentration of oxygen in the flue gas was constant at 2.0 mol. % as the flow rate of the tail gas to the incinerator changed. FIG. 3 also shows that the incinerator was able to maintain a constant concentration of oxygen in the flue gas when the temperature of the incinerator was variable. Accordingly, it is possible to successfully control the concentration of oxygen in the tail gas when the temperature of the incinerator is variable.

Figure 4:
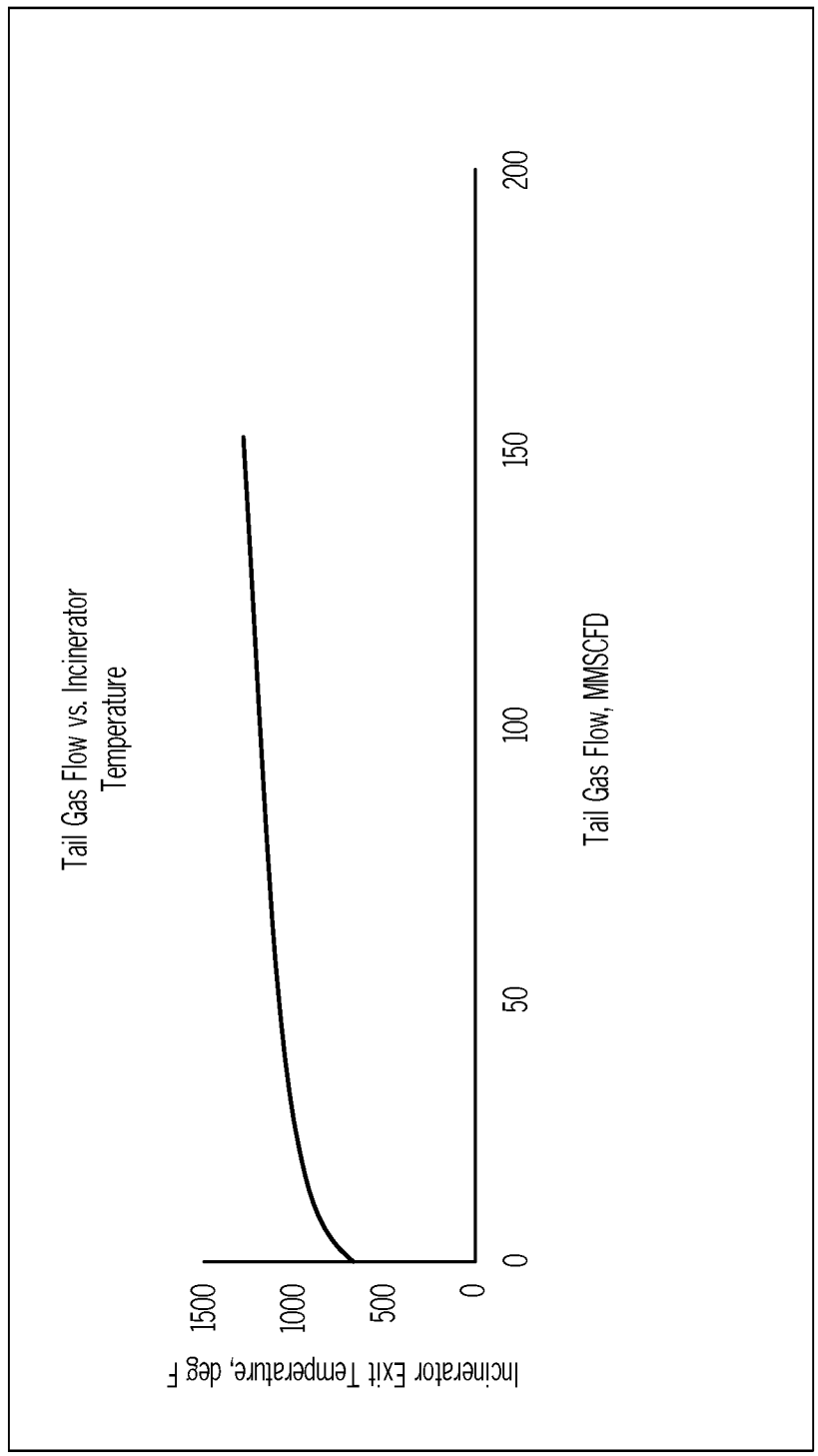
FIG. 4 depicts the relationship between the tail gas flow rate and the incinerator temperature according to an exemplary embodiment described herein.

FIG. 4 depicts the temperature of the incinerator as the flow rate of the tail gas changed such that the concentration of hydrogen sulfide in the tail gas was maintained at 6.2 ppm by mol. A regression was performed on the data obtained from the HYSYS simulation depicted in FIG. 4 to determine the relationship between the flow rate of the tail gas and the incinerator temperature set point. The relationship between the temperature set point and the flow rate of the tail gas is displayed in Equation 5:

$$T_{sp} = 655.34 \times F_{tail\ gas}^{0.1335} \quad \text{Equation 5}$$

In Equation 2, $T_{sp}$ is the temperature set point of the incinerator in ° F. and $F_{tail\ gas}$ is the tail gas flow rate in MMSCFD. This relationship could be used to determine the set point for the temperature of the incinerator based on the flow rate of the tail gas entering the incinerator. Accordingly, the temperature of the incinerator could be controlled based on the flow rate of the tail gas stream.

According to a first aspect of the present disclosure, a method for controlling a temperature of an incinerator may comprise determining a flow rate of a gas stream. The gas stream is being passed from a sulfur recovery system to the incinerator. The method may include adjusting a target temperature of the incinerator. The target temperature of the incinerator is proportional to the flow rate of the gas stream. The method may include determining a temperature of the incinerator and adjusting the flow rate of a fuel gas being passed to the incinerator such that the temperature of the incinerator approaches the target temperature of the incinerator.

A second aspect of the present disclosure may include the first aspect, where determining the flow rate of the gas stream comprises measuring the flow rate of the gas stream with a flow meter.

A third aspect of the present disclosure may include the first aspect, where determining the flow rate of the gas stream comprises calculating the flow rate of the gas stream from a mass balance of the sulfur recovery system.

A fourth aspect of the present disclosure may include any of the first through third aspects, where determining the temperature of the incinerator comprises measuring the temperature of a flue gas exiting the incinerator with a temperature sensor.

A fifth aspect of the present disclosure may include any of the first through fourth aspects, where the target temperature of the incinerator is greater than or equal to a minimum target temperature, wherein the minimum target temperature corresponds to a minimum flow rate at which the incinerator is operable.

A sixth aspect of the present disclosure may include any of the first through fifth aspects, where the target temperature of the incinerator is less than or equal to a maximum target temperature, wherein the maximum target temperature corresponds to a maximum flow rate at which the incinerator is operable.

A seventh aspect of the present disclosure may include any of the first through sixth aspects, where the method is performed by a control system comprising a temperature controller.

According to an eighth aspect of the present disclosure, a method for converting hydrogen sulfide to sulfur dioxide may include passing a gas stream comprising hydrogen sulfide to an incinerator, passing an oxygen containing gas to the incinerator, passing a fuel gas to the incinerator, combusting at least a portion of the fuel gas to heat the incinerator; converting at least a portion of the hydrogen sulfide to sulfur dioxide in the incinerator; and passing a flue gas comprising sulfur dioxide from the incinerator. The incinerator has a temperature controlled by a method including determining a flow rate of the gas stream and adjusting a target temperature of the incinerator. The target temperature of the incinerator is proportional to the flow rate of the gas stream. The method for controlling the temperature of the incinerator may also include determining a temperature of the incinerator and adjusting the flow rate of the fuel gas to the incinerator such that the temperature of the incinerator approaches the target temperature of the incinerator.

A ninth aspect of the present disclosure may include any of the first through eighth aspects where a concentration of hydrogen sulfide in the gas stream is from 10 ppm by mole to 400 ppm by mole.

A tenth aspect of the present disclosure may include any of the first through ninth aspects where a concentration of hydrogen sulfide in the gas stream is substantially constant.

An eleventh aspect of the present disclosure may include any of the eighth through tenth aspects, where the gas stream is being passed from a sulfur recovery system to the incinerator.

A twelfth aspect of the present disclosure may include any of the first through eleventh aspects, where the fuel gas comprises methane, ethane, propane, or combinations thereof.

A thirteenth aspect of the present disclosure may include any of the eighth through twelfth aspects, where the flue gas further comprises hydrogen sulfide and a concentration of hydrogen sulfide in flue gas is less than or equal to 150 ppm by volume.

A fourteenth aspect of the present disclosure may include any of the eighth through thirteenth aspects, where the oxygen containing gas is air.

A fifteenth aspect of the present disclosure may include any of the eighth through fourteenth aspects, where determining the flow rate of the gas stream comprises measuring the flow rate of the gas stream with a flow meter.

A sixteenth aspect of the present disclosure may include any of the eighth through fourteenth aspects, where determining the flow rate of the gas stream comprises calculating the flow rate of the gas stream from a mass balance on the sulfur recovery system.

A seventeenth aspect of the present disclosure may include any of the eighth through sixteenth aspects, where the flue gas further comprises $O_2$ and a concentration of $O_2$ in the flue gas is controlled by determining a concentration of $O_2$ in the flue gas, and adjusting a flow rate of the oxygen containing gas being passed to the incinerator such that the concentration of $O_2$ in the flue gas approaches a target concentration of $O_2$.

An eighteenth aspect of the present disclosure may include the seventeenth aspect, where determining the concentration of $O_2$ in the flue gas comprises measuring the concentration of $O_2$ with an oxygen sensor.

A nineteenth aspect of the present disclosure may include either of the seventeenth or eighteenth aspects, where the target concentration of $O_2$ in the flue gas is from 1 mol. % to 3 mol. %.

The subject matter of the present disclosure has been described in detail and by reference to specific embodiments. It should be understood that any detailed description of a component or feature of an embodiment does not necessarily imply that the component or feature is essential to the particular embodiment or to any other embodiment. Further, it should be apparent to those skilled in the art that various modifications and variations can be made to the described embodiments without departing from the spirit and scope of the claimed subject matter.

It is noted that one or more of the following claims utilize the term "wherein" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising." Furthermore, it should be understood that where a first component is described as "comprising" a second component, it is contemplated that, in some embodiments, the first component "consists" or "consists essentially of" that second component.

It should be understood that any two quantitative values assigned to a property may constitute a range of that property, and all combinations of ranges formed from all stated quantitative values of a given property are contemplated in this disclosure.

What is claimed is:

1. A method for controlling a temperature of an incinerator, the method comprising:
    passing a gas stream comprising hydrogen sulfide from a sulfur recovery system to an incinerator;
    determining a flow rate of the gas stream;
    adjusting a target temperature of the incinerator, wherein the target temperature of the incinerator is proportional to the flow rate of the gas stream such that adjusting the target temperature of the incinerator comprises calculating the target temperature of the incinerator using an equation relating the flow rate of the gas stream to the target temperature of the incinerator;
    determining a temperature of the incinerator;
    passing a fuel gas to the incinerator; and
    adjusting the flow rate of the fuel gas such that the temperature of the incinerator approaches the target temperature of the incinerator.

2. The method of claim 1, wherein determining the flow rate of the gas stream comprises measuring the flow rate of the gas stream with a flow meter.

3. The method of claim 1, wherein determining the flow rate of the gas stream comprises calculating the flow rate of the gas stream from a mass balance on the sulfur recovery system.

4. The method of claim 1, wherein determining the temperature of the incinerator comprises measuring the temperature of a flue gas exiting the incinerator with a temperature sensor.

5. The method of claim 1, wherein the target temperature of the incinerator is greater than or equal to a minimum target temperature, wherein the minimum target temperature corresponds to a minimum flow rate at which the incinerator is operable.

6. The method of claim 1, wherein the target temperature of the incinerator is less than or equal to a maximum target temperature, wherein the maximum target temperature corresponds to a maximum flow rate at which the incinerator is operable.

7. The method of claim 1, wherein the method is performed by a control system comprising a temperature controller.

8. A method for converting hydrogen sulfide to sulfur dioxide, the method comprising:
    passing a gas stream comprising hydrogen sulfide to an incinerator;
    passing an oxygen containing gas to the incinerator;
    passing a fuel gas to the incinerator;
    combusting at least a portion of the fuel gas to heat the incinerator;
    converting at least a portion of the hydrogen sulfide to sulfur dioxide in the incinerator; and
    passing a flue gas comprising sulfur dioxide from the incinerator, wherein the incinerator has a temperature controlled by:
    determining a flow rate of the gas stream;
    adjusting a target temperature of the incinerator, wherein the target temperature of the incinerator is proportional to the flow rate of the gas stream such that adjusting the target temperature of the incinerator comprises calculating the target temperature of the incinerator using an equation relating the flow rate of the gas stream to the target temperature of the incinerator;

determining the temperature of the incinerator; and adjusting the flow rate of the fuel gas to the incinerator such that the temperature of the incinerator approaches the target temperature of the incinerator.

9. The method of claim 8, wherein a concentration of hydrogen sulfide in the gas stream is from 10 ppm by mole to 400 ppm by mole.

10. The method of claim 8, wherein a concentration of hydrogen sulfide in the gas stream is substantially constant.

11. The method of claim 8, wherein the gas stream is being passed from a sulfur recovery system to the incinerator.

12. The method of claim 8, wherein the fuel gas comprises methane, ethane, propane, or combinations thereof.

13. The method of claim 8, wherein the flue gas further comprises hydrogen sulfide and a concentration of hydrogen sulfide in flue gas is less than or equal to 150 ppm by volume.

14. The method of claim 8, wherein the oxygen containing gas is air.

15. The method of claim 8, wherein determining the flow rate of the gas stream comprises measuring the flow rate of the gas stream with a flow meter.

16. The method of claim 8, wherein determining the flow rate of the gas stream comprises calculating the flow rate of the gas stream from a mass balance on the sulfur recovery system.

17. The method of claim 8, wherein the flue gas further comprises $O_2$ and a concentration of $O_2$ in the flue gas is controlled by:

determining a concentration of $O_2$ in the flue gas; and adjusting a flow rate of the oxygen containing gas being passed to the incinerator such that the concentration of $O_2$ in the flue gas approaches a target concentration of $O_2$.

18. The method of claim 17, wherein determining the concentration of $O_2$ in the flue gas comprises measuring the concentration of $O_2$ with an oxygen sensor.

19. The method of claim 17, wherein the target concentration of $O_2$ in the flue gas is from 1 mol. % to 3 mol. %.

* * * * *